(12) United States Patent
Wood

(10) Patent No.: US 7,290,655 B1
(45) Date of Patent: Nov. 6, 2007

(54) CARRYING CASE ASSEMBLY FOR A POWER TOOL AND ITS ASSOCIATED METHOD OF USE

(76) Inventor: Michael D. Wood, 105 Fairacres Dr., Lansdale, PA (US) 19446

( * ) Notice: Subject to any disclaimer, the term of this patent is extended or adjusted under 35 U.S.C. 154(b) by 444 days.

(21) Appl. No.: 10/850,916

(22) Filed: May 24, 2004

(51) Int. Cl.
*A45C 11/26* (2006.01)
(52) U.S. Cl. .................................... 206/349; 206/373
(58) Field of Classification Search ............... 206/349, 206/372, 373, 549, 576
See application file for complete search history.

(56) References Cited

U.S. PATENT DOCUMENTS

| | | | | |
|---|---|---|---|---|
| 3,371,975 A | * | 3/1968 | Meltzer | 55/385.1 |
| 3,578,153 A | | 5/1971 | Olson | 206/17 |
| 4,252,239 A | * | 2/1981 | Snyder | 206/349 |
| 4,371,079 A | * | 2/1983 | Dembicks | 206/349 |
| 4,728,017 A | * | 3/1988 | Mullican | 224/404 |
| 5,119,937 A | * | 6/1992 | Reynolds, Jr. | 206/349 |
| 5,224,531 A | * | 7/1993 | Blohm | 144/285 |
| 5,333,823 A | * | 8/1994 | Joseph | 248/146 |
| 5,339,956 A | | 8/1994 | Thomason | 206/372 |
| 5,533,843 A | | 7/1996 | Chung | 408/241 |
| 6,793,074 B2 | * | 9/2004 | Anderson et al. | 206/349 |

* cited by examiner

*Primary Examiner*—David T. Fidei
(74) *Attorney, Agent, or Firm*—LaMorte & Associates

(57) ABSTRACT

A carrying case assembly for a power tool and the method of interconnecting the carrying case with the power tool. The carrying case has a plurality of sides that define an internal area. An attachment mechanism is disposed within the case along a first side. The attachment mechanism receives and retains the power tool. A slot is formed in the first side of the carrying case. The cutting element of the power tool extends through the slot and extends out of the carrying case. Power is provided within the carrying case to operate the power tool within the carrying case. Work guides are provided on the exterior of the carrying case that are used to help move material against the cutting element that extends out of the carrying case from the power tool.

14 Claims, 5 Drawing Sheets

CARRYING CASE ASSEMBLY FOR A POWER TOOL AND ITS ASSOCIATED METHOD OF USE

BACKGROUND OF THE INVENTION

1. Field of the Invention

In general, the present invention relates to carrying cases that hold power tools. More particularly, the present invention relates to carrying cases for power tools that have secondary features that complement the functionality of the tool carried by the case.

2. Description of the Prior Art

There are many different types of power hand tools. Many power hand tools are sold in cases that can be used to carry the tool. The carrying case for a power hand tool typically has a main compartment that is sized to receive the power tool itself. The carrying case may also have secondary compartments for holding the bits, blades, cords or batteries that are used by the power hand tool. The carry case for a power hand tool protects the tool and makes the tool easier to transport. Furthermore, by holding accessories for a power tool in the carrying case, those accessories are transported with the power tool. This makes it easy for the power tool to be conveniently adjusted, or have its cutting blade changed.

Prior art power tool carrying cases that carry both a power tool and the accessories for that power tool are exemplified by U.S. Pat. No. 3,578,153 to Olsen, entitled Drill Holder Device, which shows a carrying case for a drill and a holder for different drill bits within the same carrying case.

In the prior art, the carrying case for a tool rarely has any secondary function other than to hold a power tool and the accessories commonly used in association with the power tool. Typically, any such specialized carrying case would only provide a medium to power the tool being carried. For instance, in U.S. Pat. No. 5,533,843 to Chung, entitled, Electric Hand Drill Set, the carrying case of a power drill is described that plugs into an electrical outlet. The carrying case then recharges a battery operated drill when the drill is stored within the carrying case.

In U.S. Pat. No. 5,339,956 to Thomason, entitled Tool Box With Combined Elements, a tool carrying case is provided that contains an internal power extension cord. In this manner, the carrying case can be used as the medium to power any power tool carried in the carrying case.

Hand held power tools are often stored and carried in carrying cases for convenience. Since hand held tools are guided by a user's hand, such tools are good for general work. However, instability inherent in a hand held tool often makes those tools poorly suited for precise work. If precision is needed in working some material, that material is typically taken to a corresponding bench top tool. Bench top tools rest on stable platforms and do not rely on the steadiness of a user's hand in their operation. For example, if holes have to be precisely drilled in a piece of metal at exact points, a person typically would not be able to achieve such precision with a handheld drill. Rather, the piece of metal would be taken to a drill press that can drill such precise holes.

Recognizing that sometimes precision is important, there exist many types of accessories for hand tools that increase the precision of the hand tool and cause the hand tool to perform more like a bench mounted tool. For example, router tables exist for routers and hold the routers in an exact position as wood is passed across the router's bit. Similarly, drill guides exist for hand held drills that ensure the drill bit is straight as it drills through material. Auxiliary guides also exist for circular saws, saber saws and most other cutting tools. However, such accessory guides are typically bought separately from the power tool and cannot be stored in the carrying case of the power tool. The use of such accessory guides is, therefore, often both time consuming and inconvenient.

Although various carrying cases do exist for tools that provide power to the tools, prior art carrying cases have not been configured as an accessory to a power tool so that the power tool can be used with more precision. The need therefore exists for a carrying case for a power tool that can be attached to the power tool to increase the precision and stability of the power tool. This need is met by the present invention as claimed and described below.

SUMMARY OF THE INVENTION

The present invention is a carrying case assembly for a power tool and the method of interconnecting the carrying case with the power tool when the power tool is in use. The carrying case has a plurality of sides that define an internal area large enough to store the power tool when the tool is not in use. An attachment mechanism is disposed within the case along a first side. The attachment mechanism receives and retains the power tool, thereby holding the power tool flush against an interior surface of the carrying case when the tool is to be used.

A slot is formed in the first side of the carrying case. As the power tool is held against the interior of the first side, the cutting element of the power tool extends through the slot and extends out of the carrying case. Power is provided within the carrying case to operate the power tool within the carrying case. Work guides are provided on the exterior of the carrying case that are used to help move material against the cutting element that extends out of the carrying case from the power tool.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention carrying case system can be used to carry most any type of portable power hand tool, the carrying case system is best suited for use in carrying cutting tools, such as saws, routers and drills, that cut material. Accordingly, by way of example, the present invention carrying case system will be illustrated and described in use with various power hand tools that cut material. Such embodiments are merely exemplary and are presented to set forth the best mode contemplated for the invention. However, such selected embodiments should not be considered limitations to the carrying case system and its application to other types of tools not specifically illustrated.

Figure 1:
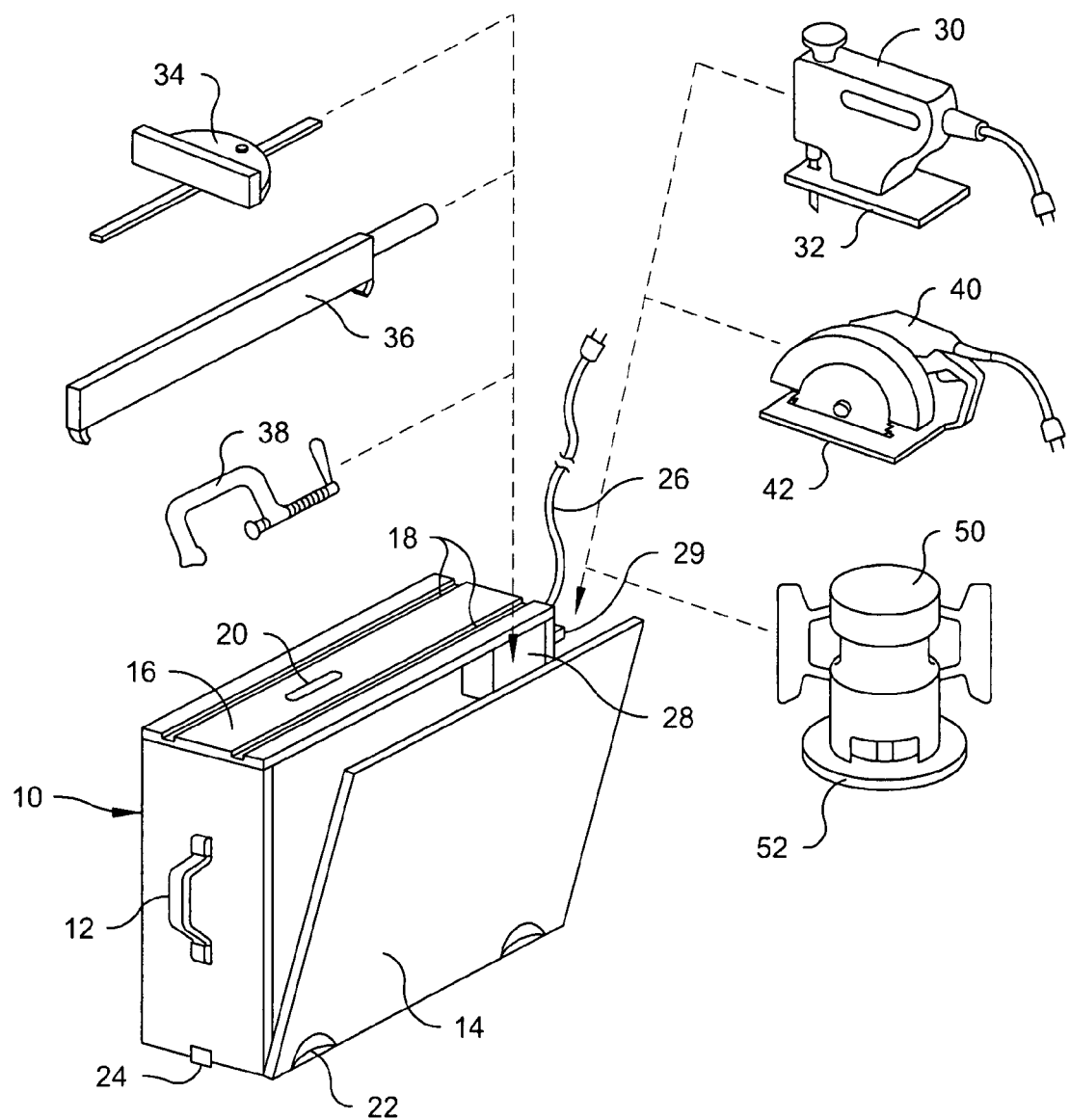
FIG. 1 is an open perspective view of a carrying case with an exploded view of the selected power tools and accessories that may be contained within the carrying case.

Referring to FIG. 1, there is shown a first embodiment of a carrying case 10 in accordance with the present invention. The carrying case 10 is a rigid case having six generally flat surfaces. At least one handle 12 is provided so that the carrying case 10 can be easily lifted and carried. The carrying case 10 has a side panel door 14 that enables the interior regions of the carrying case 10 to be easily accessed. The interior regions defined by the carrying case 10 are large enough to hold a power tool and its accessories when the power tool is not in use.

The carrying case 10 is formed with a top panel 16 that can be selectively opened and closed to access the interior regions of the carrying case 10. The top panel 16 is used to mount a power tool, as will later be described.

The top panel 16 defines at least one guide groove 18 that runs along the length of the top panel 16 along its exterior. Furthermore, a blade slot 20 is formed in the top panel 16 for enabling the bit or blade of a power tool within the carrying case 10 to extend out beyond the exterior of the top panel 16. The size and shape of the blade slot 20 is dependent upon the type of power tool being carried within the carrying case 10.

Along the base of the carrying case 10 are disposed clamping recesses 22. The clamping recesses 22 are used to mount the carrying case 10 to a tabletop or other support structure, as will later be described. Additionally, a clamping rail 24 can be attached to the bottom of the carrying case 10. The clamping rail 24 provides a surface that can be engaged by a vise and therefore provides a means to attach the carrying case 10 to a tabletop.

A power cord 26 leads to the carrying case 10. The power cord 26 powers a power receptacle 28 positioned within the interior of the carrying case 10. An on/off switch 29 is disposed on the exterior of the carrying case 10. As will later be explained, the on/off switch 29 controls the flow of electricity to any power tool that may be mounted to the carrying case 10.

The carrying case 10 defines an internal region that is used to hold various power tools. In the embodiments of the present invention that are provided, the carrying case 10 can be configured to hold various cutting power tools, such as a saber saw 30, a circular saw 40 or a router 50. All such power tools that are used for cutting have skid plates that are designed and positioned to slide along the surfaces of the work being cut. A saber saw 30 typically has a rectangular skid plate 32. A circular saw 40 also has a rectangular skid plate 42. A router, however, typically has a round skid plate 52.

Also contained within the carrying case 10 are various forms of a guide fence 34, miter gauge 36 and mounting clamps 38. The purpose of these elements will be later described.

Figure 2:
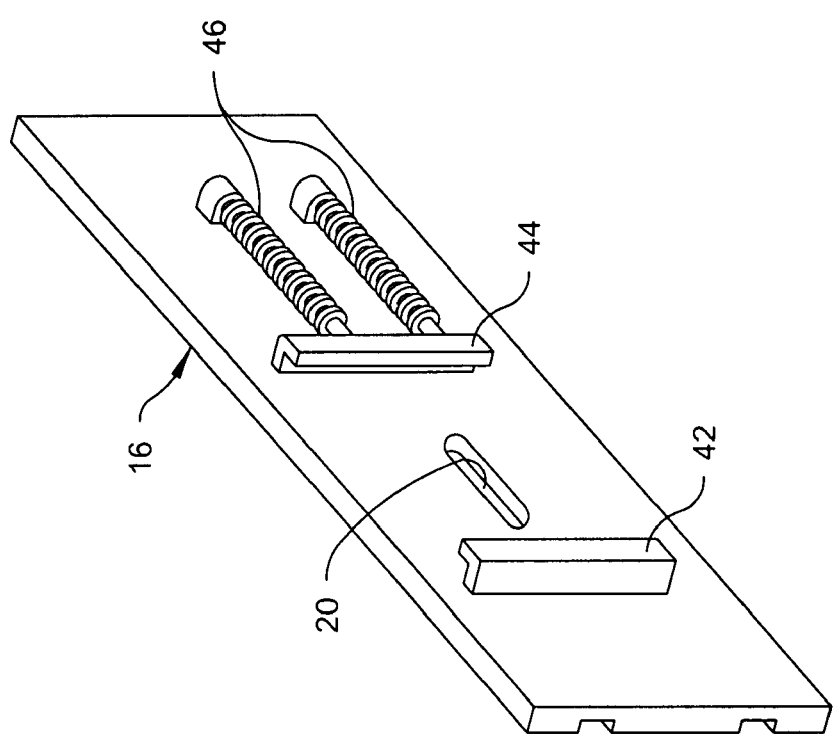
FIG. 2 is a perspective underside view of an exemplary embodiment of the top panel of the carrying case shown in FIG. 1.

Referring now to FIG. 2, an exemplary embodiment of the bottom of the top panel 16 is shown. As can be seen, a blade slot 20 is formed through the top panel 16. On one side of the blade slot 20 is mounted a fixed mounting track 42. The fixed mounting track 42 forms a structure that can receive and retain the edge of a power tool skid plate. On the opposite side of the blade slot 20 is a floating mounting track 44 that is biased into a set position by springs 46. The floating mounting track 44 also forms a structure that can receive and retain the edge of a power skid plate. Since the floating mounting track 44 is set in position by springs 46, it will be understood that the distance between the fixed mounting track 42 and the floating mounting track 44 can be varied by deforming the springs 46. In the shown embodiment, the fixed mounting track 42 and the floating mounting track 44 are parallel. Such a configuration is merely exemplary. It will later be explained that the fixed mounting track 42 and the floating mounting track 44 may be curved in order to engage curved skid plates of a power tool, such as a router.

The top panel 16 is preferably connected to the remainder of the carrying case with a hinged connection. This enables the top panel 16 to be swung open so that the fixed mounting track 42 and the floating mounting track 44 on the underside of the top panel 16 can be easily accessed.

Figure 3:
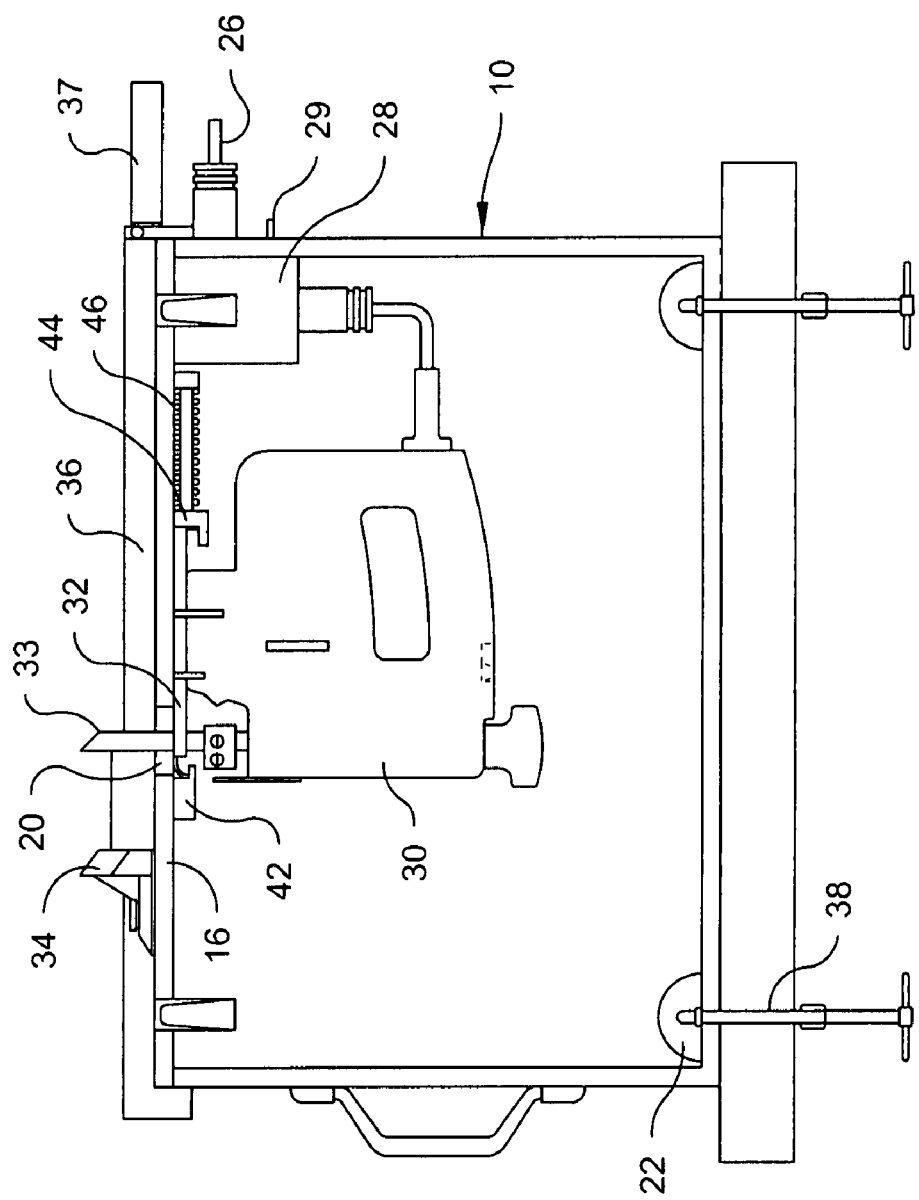
FIG. 3 is a selectively cross-sectioned view of an assembly consisting of a saber saw and a carrying case.

Referring to FIG. 3, an embodiment of the carrying case system is shown where the carrying case 10 is used to hold a saber saw 30. A portable saber saw 30 and its accessories can be carried in the carrying case 10, wherein the saber saw 30 can be removed from the carrying case 10 and used as needed. However, the carrying case 10 can also engage the saber saw 30 and add to the performance of the saber saw 30 as it cuts. Such an embodiment is set forth in FIG. 3. In FIG. 3, it can be seen that the skid plate 32 of the saber saw 30 is placed between the fixed mounting track 42 and the floating mounting track 44 on the underside of the top panel 16. The springs 46 that bias the floating mounting track 44 toward the fixed mounting track 42 cause the fixed mounting track 42 and the floating mounting track 44 to form a clamping mechanism that engages and retains the skid plate 32.

Once the skid plate 32 of the saber saw 30 is engaged by the fixed mounting track 42 and the floating mounting track 44, the saber saw 30 is connected to the underside of the top panel 16 and hangs upside down within the interior chamber of the carrying case 10. The blade 33 of the saber saw 30 extends up out of the blade slot 20 in the top panel 16. Thus, the blade 33 of the saber saw 30 protrudes out of the top of the top panel 16.

The saber saw 30 is plugged into a receptacle 28 within the carrying case 10. The receptacle 28 leads to the power cord 26 that extends outside of the carrying case 10. Power to the receptacle 28 from the power cord 26 is controlled by an on/off switch 29 on the exterior of the carrying case 10. The saber saw 30 itself is locked in an "on" condition, thereby causing the saber saw 30 to operate as soon as power is provided to the saber saw 30.

A guide fence 34 is attached to the exterior of the top panel 16. The guide fence 34 has an adjustment handle 37 that enables the guide fence 34 to be selectively clamped to the edges of the top panel 16. The guide fence 34 can therefore be selectively adjusted across the top panel 16 in any relation to the protruding blade 33 of the saber saw 30.

A miter gauge 36 rests in the guide groove on the top panel 16. The miter gauge 36 is used to move material against the protruding blade 33 of the saber saw 30 at selected angles.

In the embodiment of FIG. 3, the carrying case 10 is being clamped to a tabletop 37. This is achieved through the use of C-clamps 38 that pass over the tabletop 37 and engage the clamping recesses 22 formed along the bottom of the carrying case 10.

Figure 4:
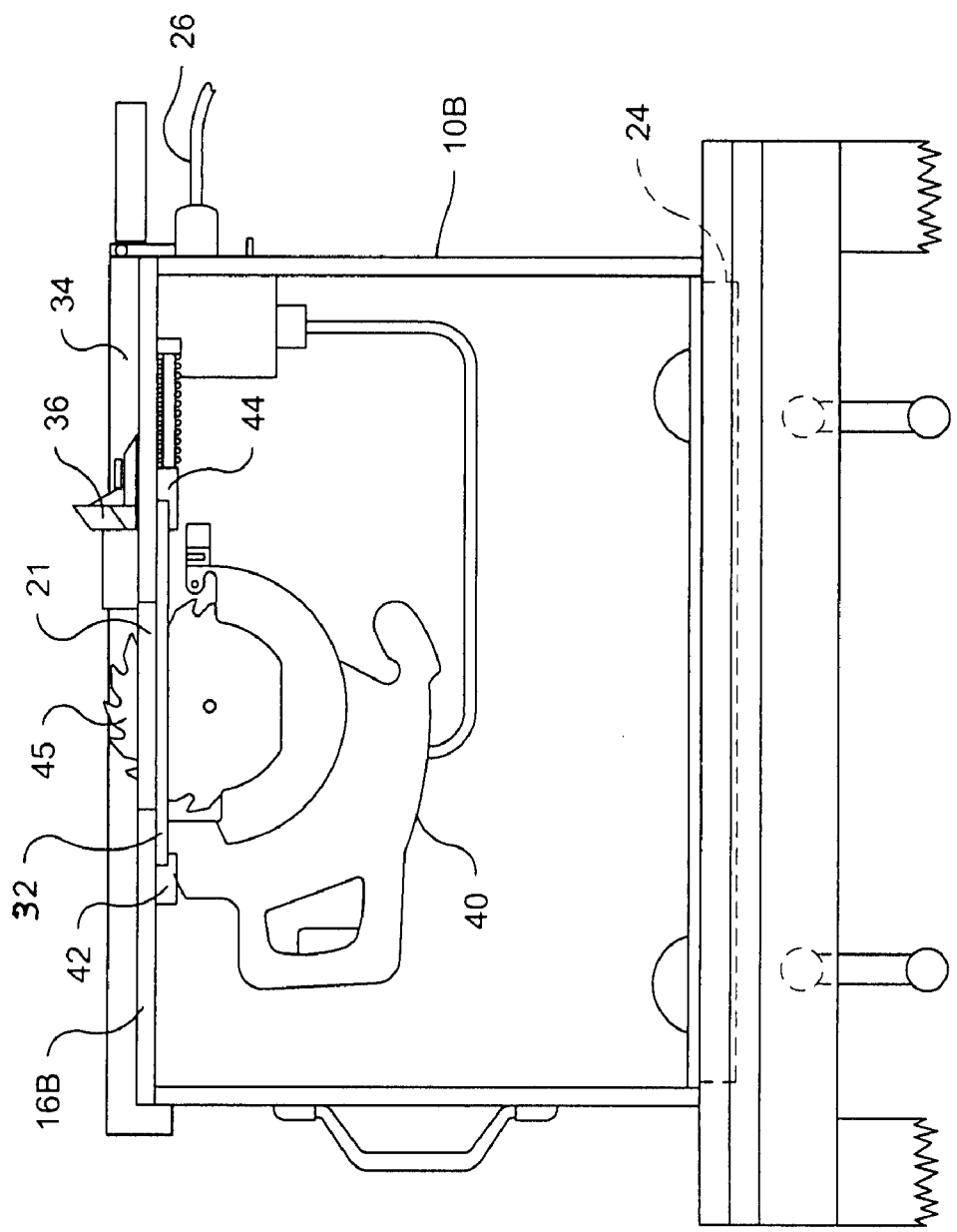
FIG. 4 is a selectively cross-sectioned view of an assembly consisting of a circular saw and a carrying case.

Referring to FIG. 4, an alternate embodiment is shown where a circular saw 40 is engaged and held by the carrying case 10B. In the embodiment of FIG. 4, the skid plate 42 of the circular saw 40 is held by the fixed mounting track 42 and the floating mounting track 44 in the same manner as was previously described for the saber saw. In the embodiment of FIG. 4, the blade slot 21 in the top panel 16B is long enough to enable the round blade 45 of the circular saw 40 to partially extend through the top panel 16B. A guide fence 34 and miter gauge 36 are then provided on the top panel door to help advance material against the rotating circular saw blade 45.

Battery powered circular saws are becoming increasingly popular. It will be understood that a battery operated saw can be attached to the top panel door in the same manner as the wired saw and that the extension power cord 26 need not be used.

In the embodiment of FIG. 4, a clamp rail 24 is attached to the bottom of the carrying case 10B. Many commercially available work benches have a vise clamp built into the top of the workbench. The clamping rail 24 on the carrying case 10B provides a structure that can be engaged by such a vise clamp. In this manner, C-clamps need not be used to attach the carrying case 10B to a workbench.

Figure 5:
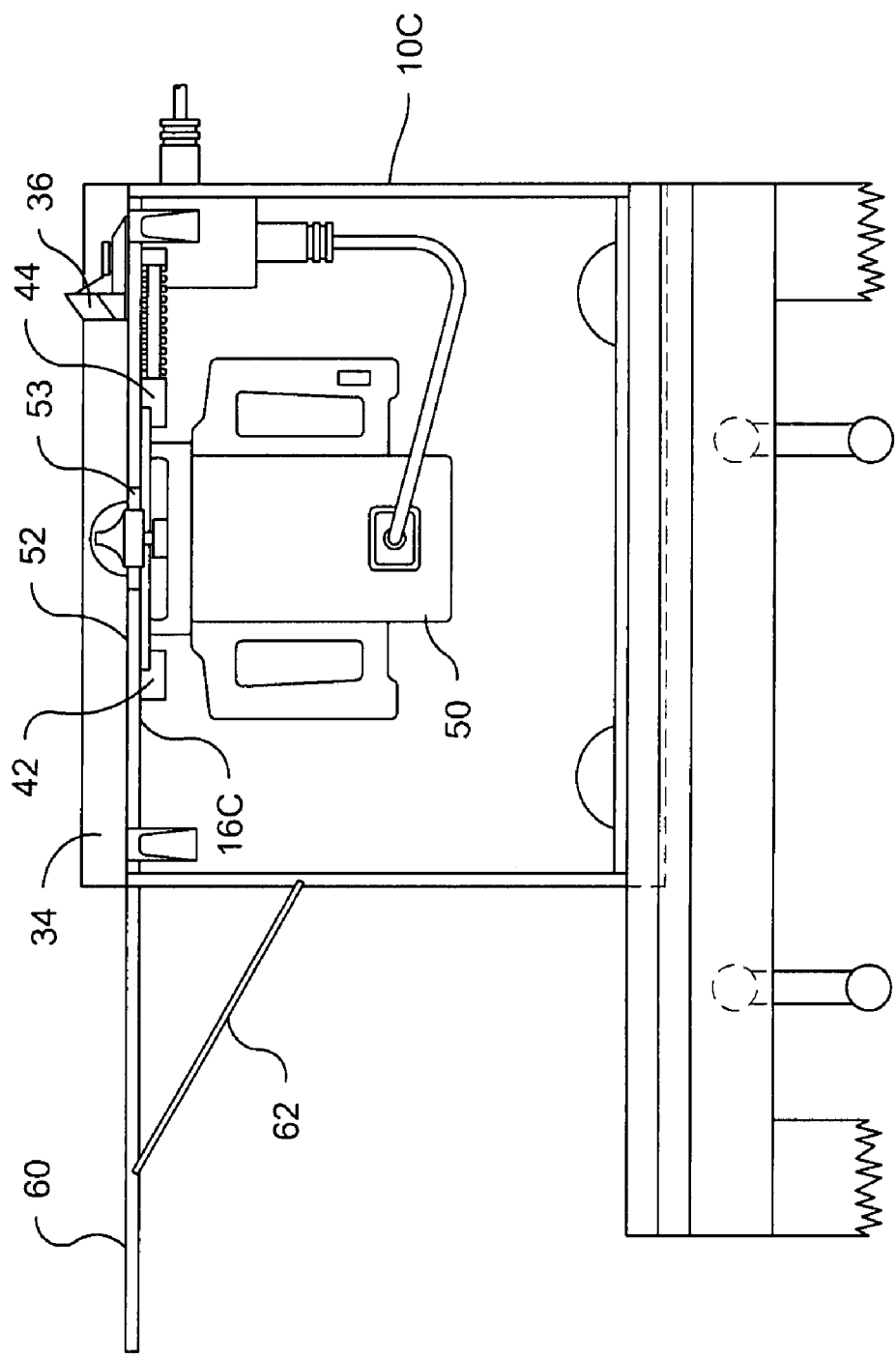
FIG. 5 is a selectively cross-sectioned view of an assembly consisting of a router and a carrying case.

Referring to FIG. 5, yet another embodiment of the present invention carrying case system is shown, where the carrying case 10C is used to hold and mount a power router 50. In the embodiment of FIG. 5, the skid plate 52 of the router 50 is held by the fixed mounting track 42 and the floating mounting track 44 in the same manner as was previously described for the saber saw and circular saw. It will be understood that the skid plate 52 of the router 50 is circular. As such, the fixed mounting track 42 and the floating mounting track 44 of the shown embodiment are curved to match the curved shape of the circular skid plate 52.

In the embodiment of FIG. 5, the blade slot 53 in the top panel 16C is large enough to enable the router bit 55 from the router 50 to partially extend up through the top panel 16C. A guide fence 34 and miter gauge 36 are then provided on the top panel 16C to help advance material against the rotating router bit 55.

In FIG. 5, an extension flap 60 is also shown extending from the forward edge of the top panel 16C. The extension flap 60 can be selectively extended into a horizontal position and locked into place with a support rod 62. The extension flap 60 increases the effective length of the top panel 16C and enables the top panel 16C to support much larger pieces of material.

The embodiments of the power tools illustrated in this specification are merely exemplary. Many different types of cutting tools exist other than have been illustrated. It will be understood that the present invention carrying case system can be adapted for use with any cutting tool having a skid plate. All such variations, modifications and alternate embodiments are intended to be included within the scope of the present invention as defined by the appended claims.

What is claimed is:

1. A carrying case assembly for a power tool having a cutting element and a skid plate, said assembly comprising:
   a case having a plurality of sides, wherein said case defines an internal area large enough to store the power tool;
   an attachment mechanism disposed within said case on a first side of said plurality of sides that receives and retains the skid plate of the power tool, therein holding the skid plate against said first side of said plurality of sides;
   a slot in said first side of said plurality of sides that enables the cutting element of the power tool to extend out through said first side of said plurality of sides;
   a guide groove is disposed in said first side of said case; and
   a miter gauge that rides within said guide groove.

2. The assembly according to claim 1, wherein said first side of said plurality of sides can be selectively opened to expose said attachment mechanism from within said internal area.

3. The assembly according to claim 1, further including a guide fence selectively attachable to said first side of said case.

4. The assembly according to claim 1, further including recesses disposed in said case and clamps that engage said recesses for clamping said case to a secondary structure.

5. The assembly according to claim 1, further including a clamping rail extending from at least one of said plurality of sides.

6. The assembly according to claim 1, wherein said attachment mechanism includes tracks, coupled to said first side, that engage opposite edges of the skid plate of the power tool.

7. A method of mounting a portable power tool, comprising the steps of:
   providing a power tool having a cutting element and a skid plate;
   providing a carrying case large enough to store the power tool within said carrying case, said carrying case having at least one flat side with an interior surface and an exterior surface, wherein a slot is formed in said flat side that extends from said interior surface to said exterior surface;
   providing a fixed track proximate said slot that is sized to receive an edge of said skid plate therein;
   providing a floating track opposed to said fixed track that is sized to receive and edge of said skid plate therein, wherein said floating tracking is biased toward said fixed track by at least one spring element;
   placing said skid plate of said portable tool in between said fixed track and said floating track, wherein said fix track and said floating track combine to engage said skid plate and attach the portable power tool to said interior surface within said carrying case, wherein said cutting element of said cutting tool extends through said slot beyond said exterior surface.

8. The method according to claim 7, further including the step of clamping the carrying case to a stationary object that supports said carrying case.

9. A power tool and case assembly, comprising:
   a power tool having a cutting element;
   a case having a plurality of sides, wherein said case defines an internal area large enough to store the power tool;
   a mounting mechanism disposed within said case on a first side of said plurality of sides that receives and retains said power tool;
   a groove disposed in said first side of said plurality of sides opposite said mounting mechanism;
   a slot in said first side of said plurality of sides, wherein said cutting element of said power tool extends out through said slot when said power tool is connected to said first side with said mounting mechanism; and
   a miter gauge that rides within said guide groove.

10. The assembly according to claim 9, further including a power receptacle disposed within said case, an extension cord for providing power to said power receptacle and an on/off switch for selectively controlling said power receptacle, wherein said power tool is provided power through said power receptacle within said case.

11. The assembly according to claim 9, wherein said first side of said plurality of sides can be selectively opened to expose said mounting mechanism.

12. The assembly according to claim 9, further including a guide fence selectively attachable to said first side of said case.

13. The assembly according to claim 9, wherein said power tool has a skid plate and said mounting mechanism engages and retains said skid plate.

14. The assembly according to claim 9, wherein said power tool is selected from a group consisting of circular saws, routers, reciprocating saws and drills.

* * * * *